US007529060B2

(12) United States Patent
Simmons, Jr. et al.

(10) Patent No.: US 7,529,060 B2
(45) Date of Patent: May 5, 2009

(54) READ AND WRITE HEAD ELEMENT ARRANGEMENT

(75) Inventors: Ralph F. Simmons, Jr., Boise, ID (US); Vernon L Knowles, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1099 days.

(21) Appl. No.: 10/770,747

(22) Filed: Feb. 2, 2004

(65) Prior Publication Data

US 2005/0168865 A1 Aug. 4, 2005

(51) Int. Cl.
*G11B 5/584* (2006.01)
*G11B 21/02* (2006.01)

(52) U.S. Cl. .................................... 360/77.12; 360/75

(58) Field of Classification Search .................. 360/212
See application file for complete search history.

(56) References Cited

U.S. PATENT DOCUMENTS 5,488,525 A * 1/1996 Adams et al. ............ 360/77.12
6,088,184 A * 7/2000 Hu .............................. 360/76
6,563,659 B1 * 5/2003 Fasen .......................... 360/71
6,771,456 B2 * 8/2004 Winarski et al. ......... 360/78.02
6,831,805 B2 * 12/2004 Chliwnyj et al. ......... 360/77.12
6,992,857 B2 * 1/2006 Knowles et al. .......... 360/77.12
6,999,268 B2 * 2/2006 Hoerger ................... 360/77.12

* cited by examiner

*Primary Examiner*—K. Wong

(57) ABSTRACT

In one embodiment, an arrangement of elements on a head includes a first group of data element spanning a first distance on the head and a second group of data elements spanning a second spanning distance on the head greater than the first spanning distance. The second group of elements overlaps the first group of elements such that some elements are common to both groups.

2 Claims, 15 Drawing Sheets

READ AND WRITE HEAD ELEMENT ARRANGEMENT

BACKGROUND

Tape drives are used to store very large amounts of digital information on rolls of magnetic tape and are often used to backup information stored in computer systems. In a typical linear tape open (LTO) drive, magnetic tape is stored on a supply reel contained in a removable cartridge. Information on the tape, including servo information, is arranged in a multitude of parallel tracks that extend along the length of the tape. During operation, the tape is passed along a series of rollers, defining the tape path, to a non-removable take up reel in the tape drive. The tape passes in close proximity to an array of magnetic head elements that read and record information on the tape. The head elements must be accurately positioned over the desired tracks so information can be read or recorded without loss and without corrupting adjacent tracks. An actuator positions the head elements by moving the head containing the elements across the width of the tape. During coarse positioning, the actuator moves the head so that a read element is close enough to a desired track to read servo information. Subsequently, during fine positioning, the servo information is read from the track and sent to servo control circuitry, which then sends a signal to the actuator to move the head so that the elements are directly over the desired tracks and to follow the small lateral motion of the track as it passes by the head.

The capacity of a linear recording tape is determined, in part, by the number of tracks that can be read and recorded across the width of the tape. To reliably read and record all tracks, the head, tape and servo positioning system must achieve accurate head to tape alignment within system tolerances, including the dimensional stability of the tape. Magnetic tapes tend to shrink over the useful life of the tape. In addition, magnetic tapes shrink and expand in response to changes in temperature and humidity. Hence, the width of the tape can and usually does vary over time. That is to say, the tape is not dimensionally stable. As the number of tracks on a tape increase, the adverse effect of tape dimensional instability on head to tape alignment also increases.

DRAWINGS

Figure 3:
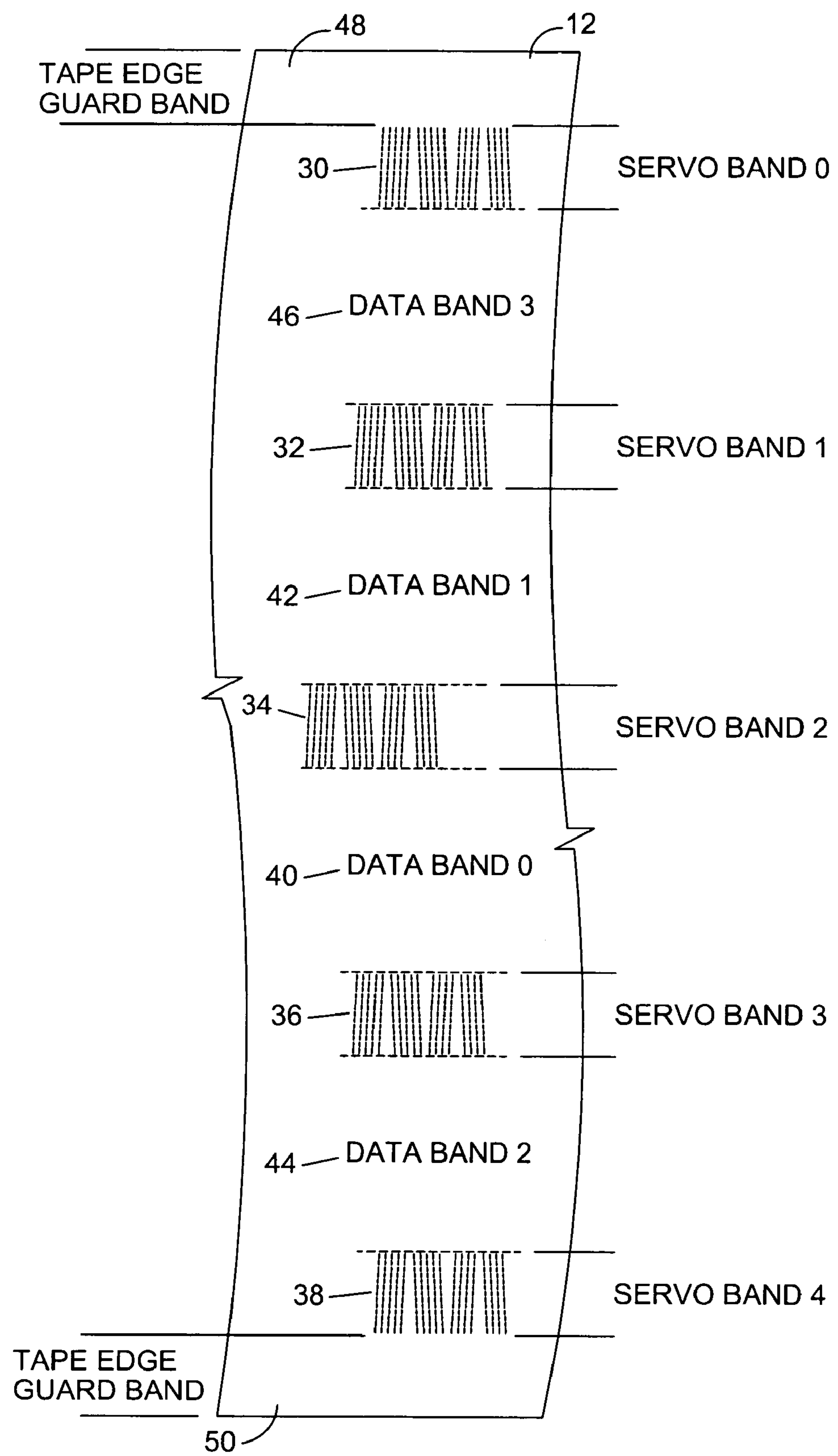
FIG. 3 shows a format typical of an LTO tape.
Figure 6:
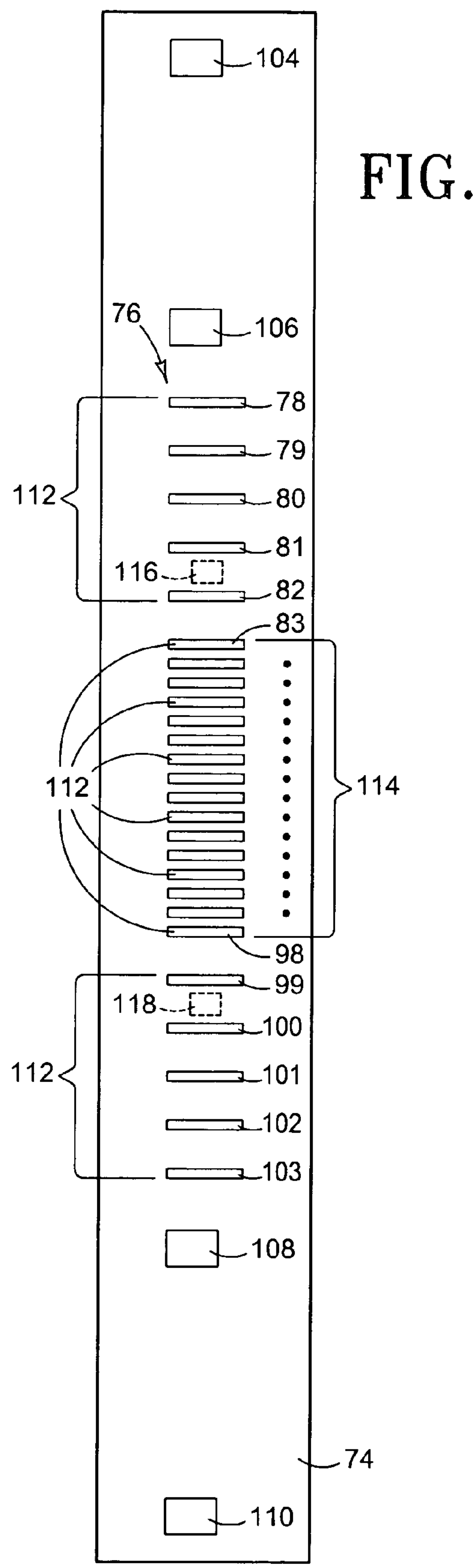
FIG. 6 is a schematic illustration of an array of head elements arranged according to one embodiment of the invention.
Figure 8:
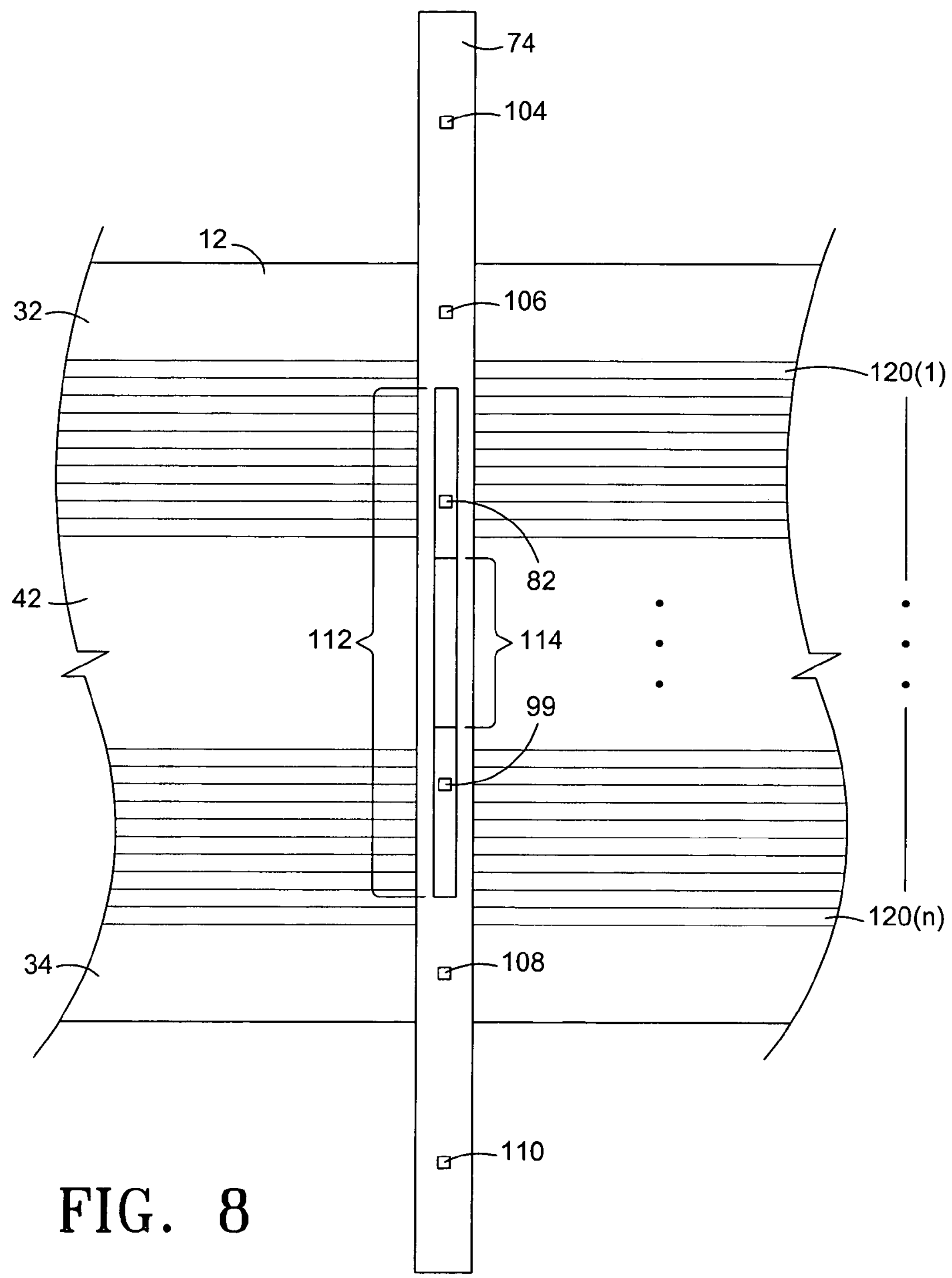
Figure 9:
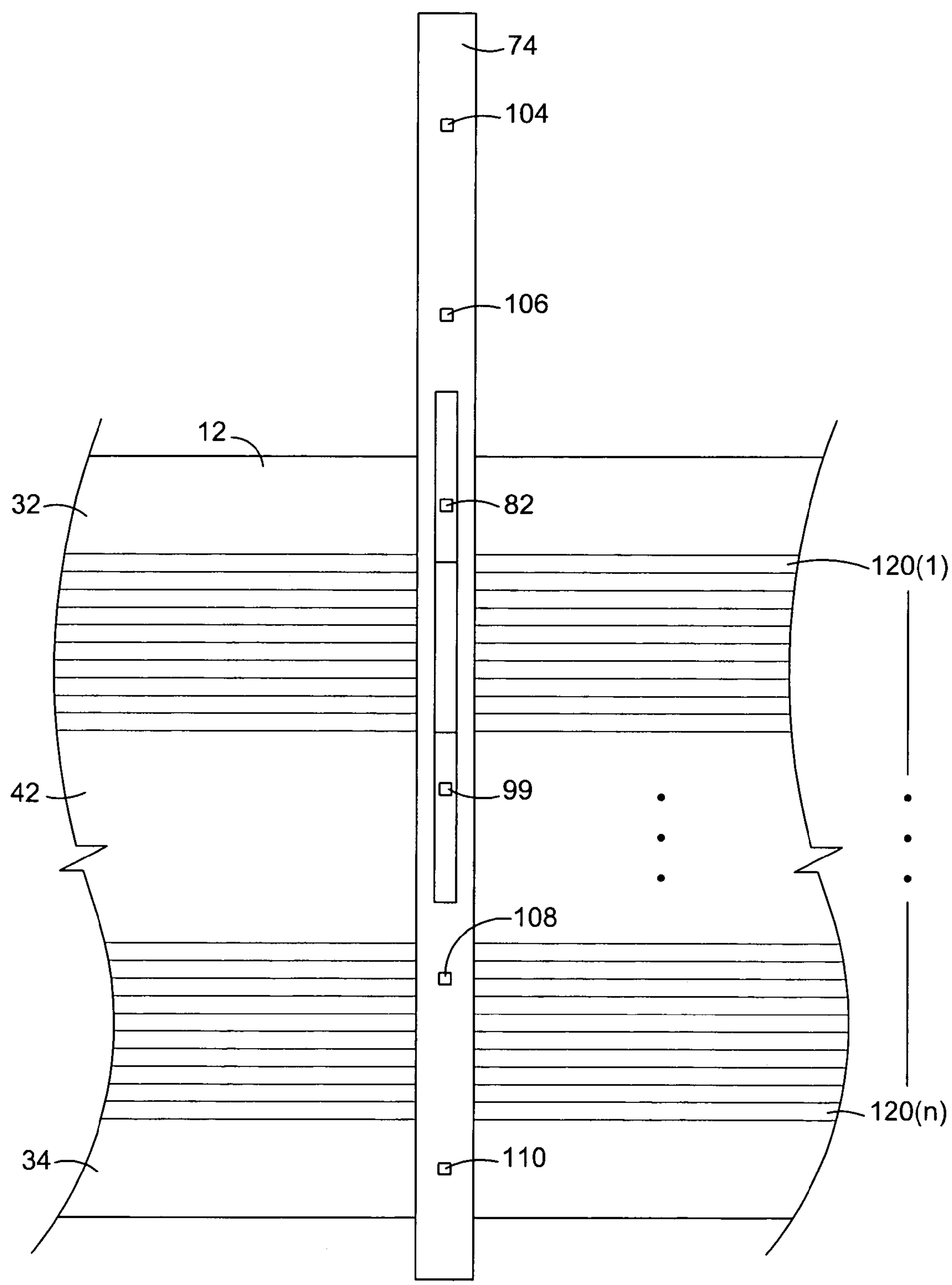
Figure 10:
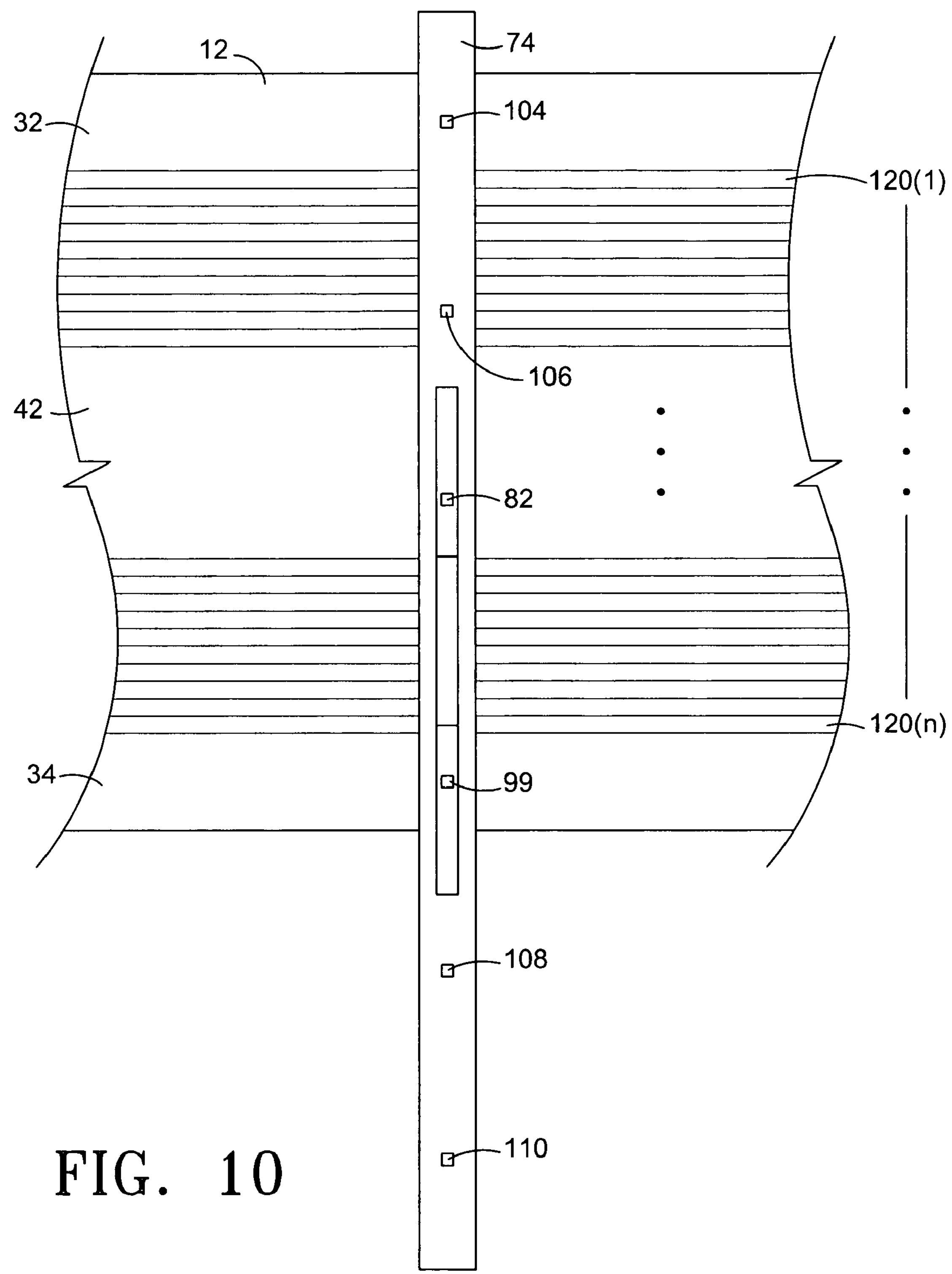

FIGS. 8-10 illustrate the head shown in FIG. 6 positioned over a data band from the tape format of FIG. 3. In FIG. 8, the head is centered over the middle of the data band. In FIG. 9, the head is centered over the top of the data band. In FIG. 10, the head is centered over the bottom of the data band.

Figure 11:
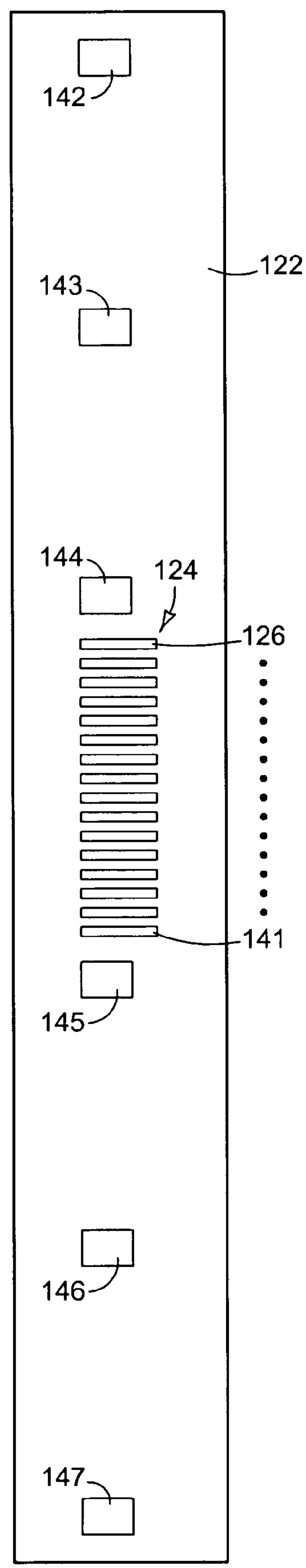

FIG. 11 is a schematic illustration of an array of head elements arranged according to one embodiment of the invention.

Figure 12:
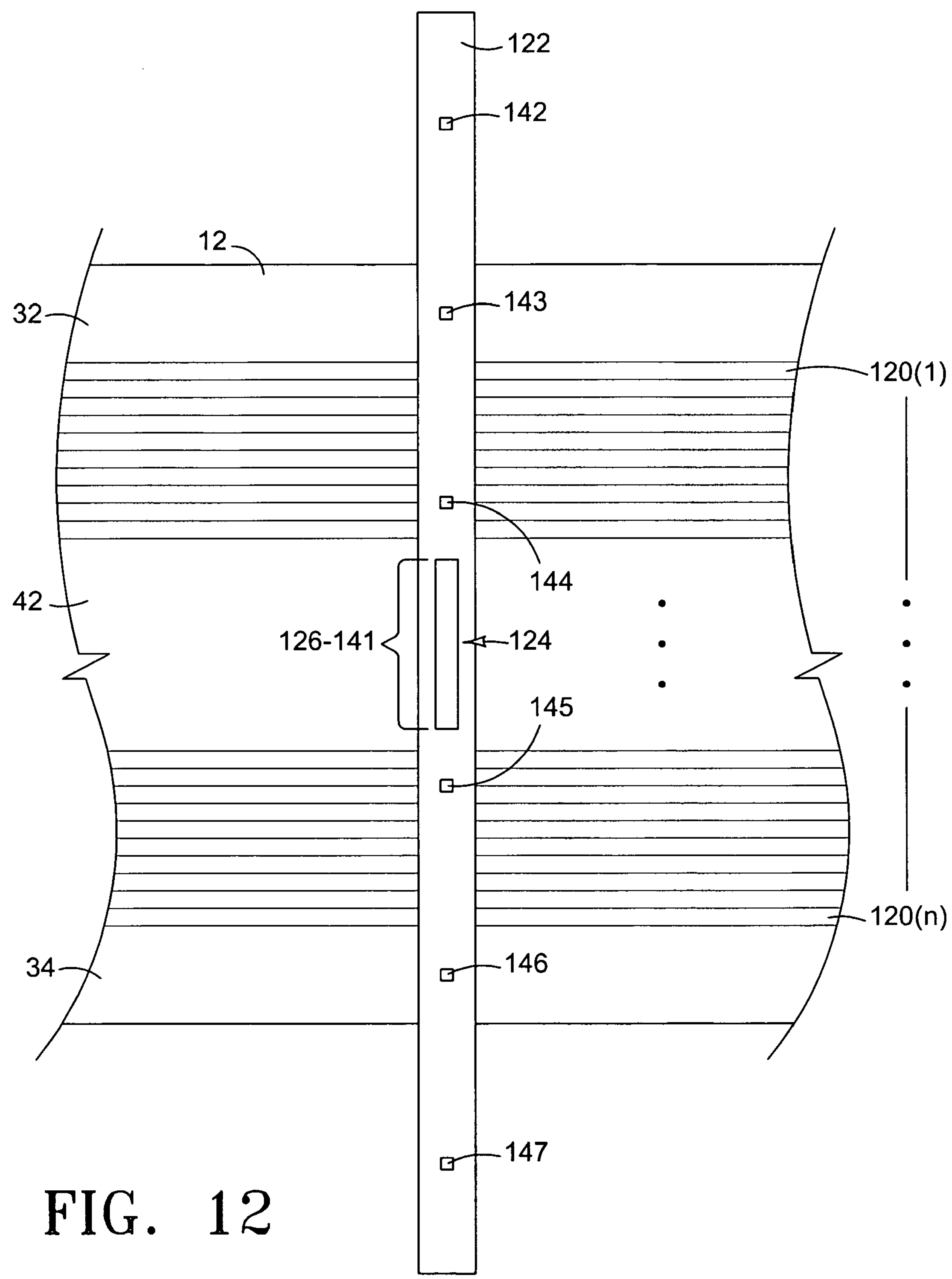
Figure 13:
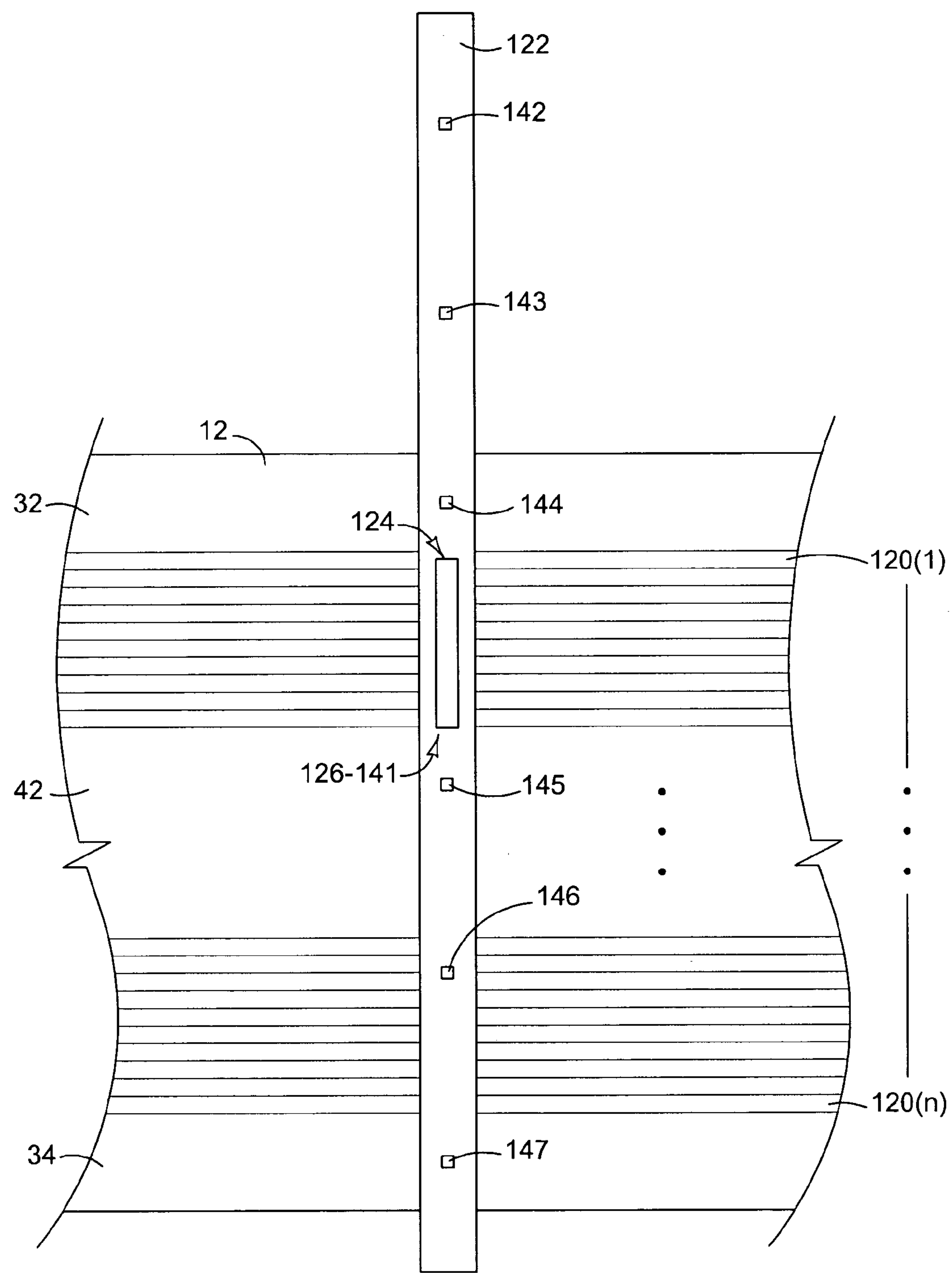
Figure 14:
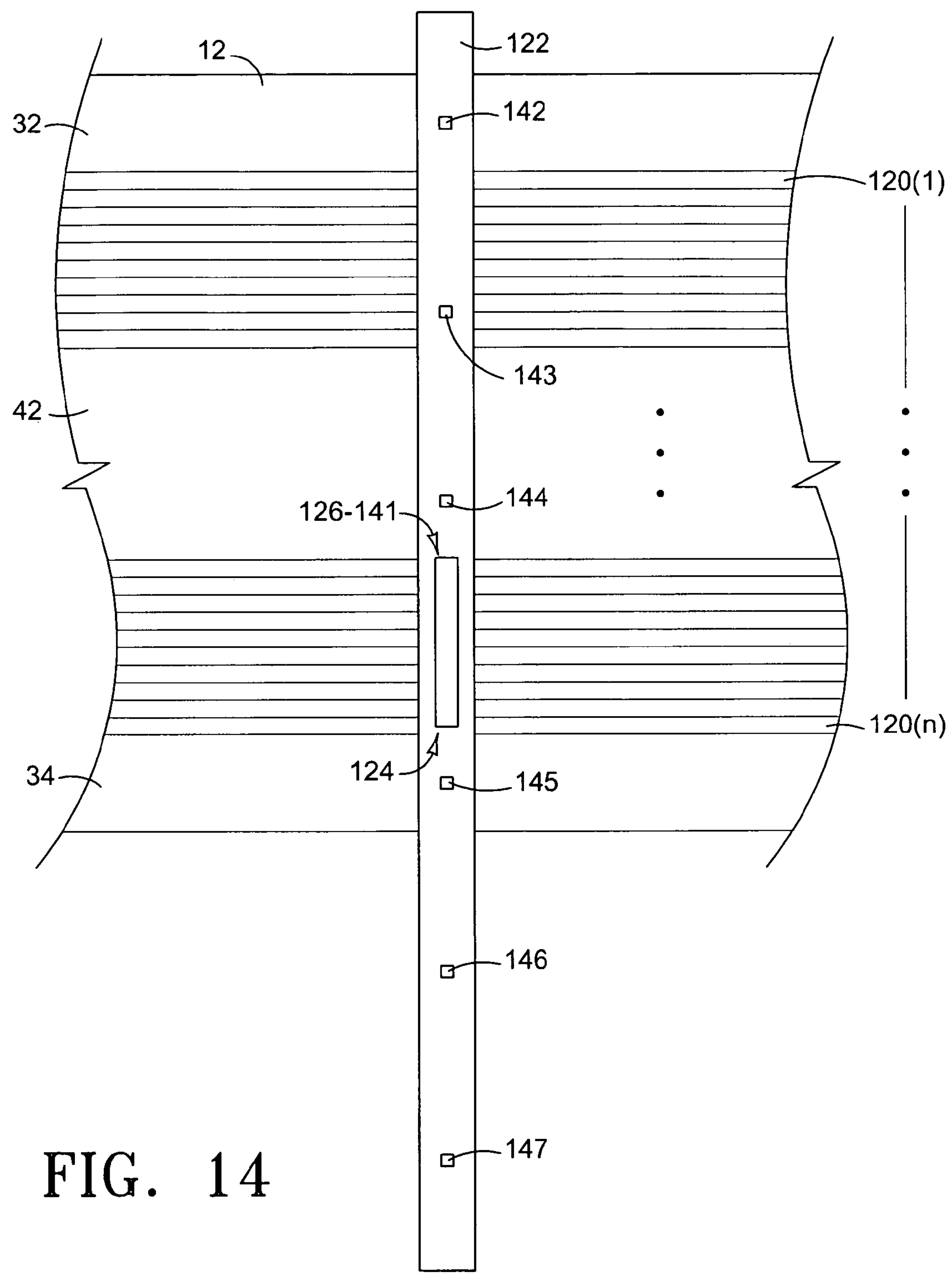

FIGS. 12-14 illustrate the head shown in FIG. 11 positioned over a data band from the tape format of FIG. 3. In FIG. 12, the head is centered over the middle of the data band. In FIG. 13, the head is centered over the top of the data band. In FIG. 14, the head is centered over the bottom of the data band.

Figure 15:
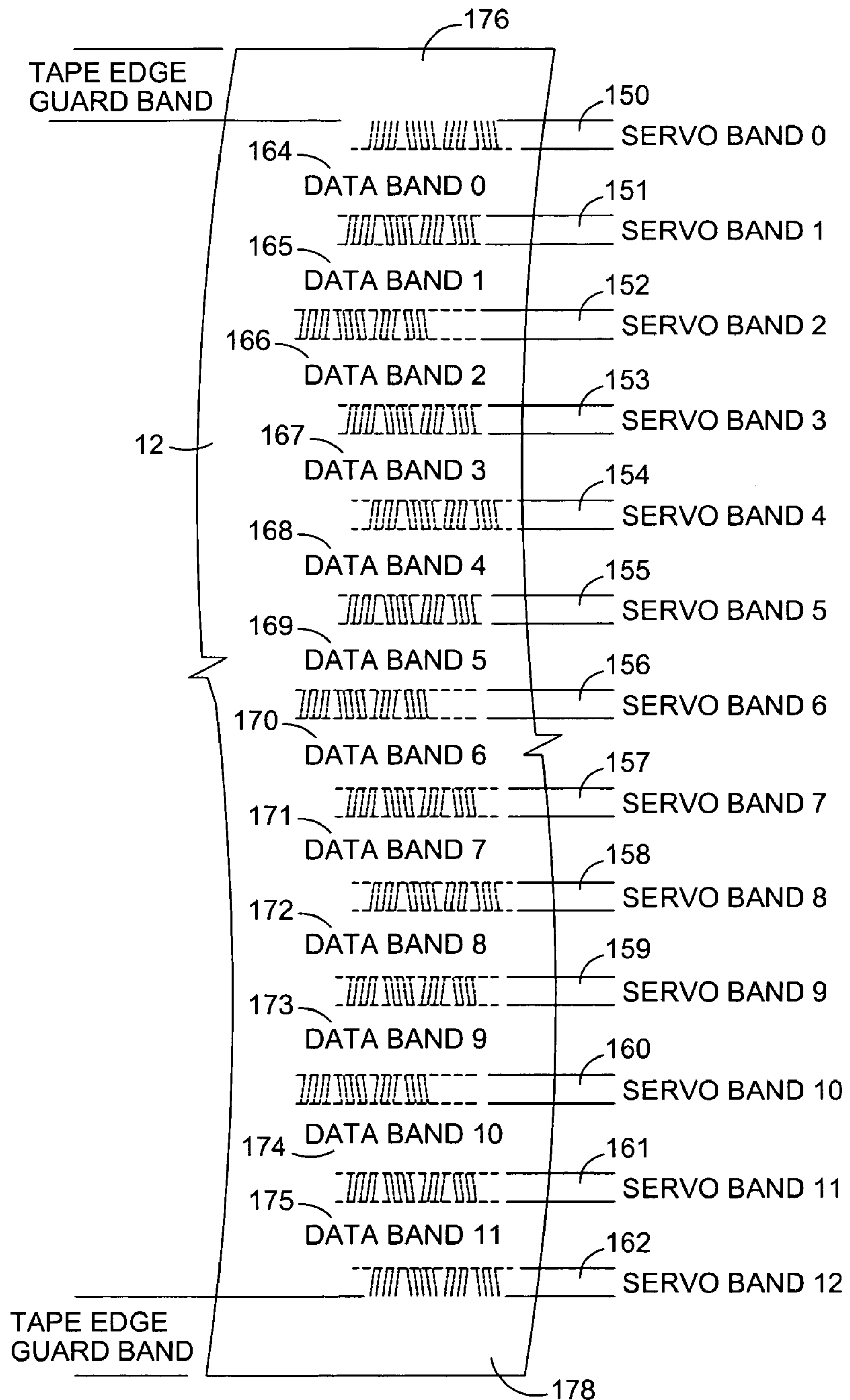

FIG. 15 shows a tape format that might be used, for example, in a next generation LTO tape.

Figure 16:
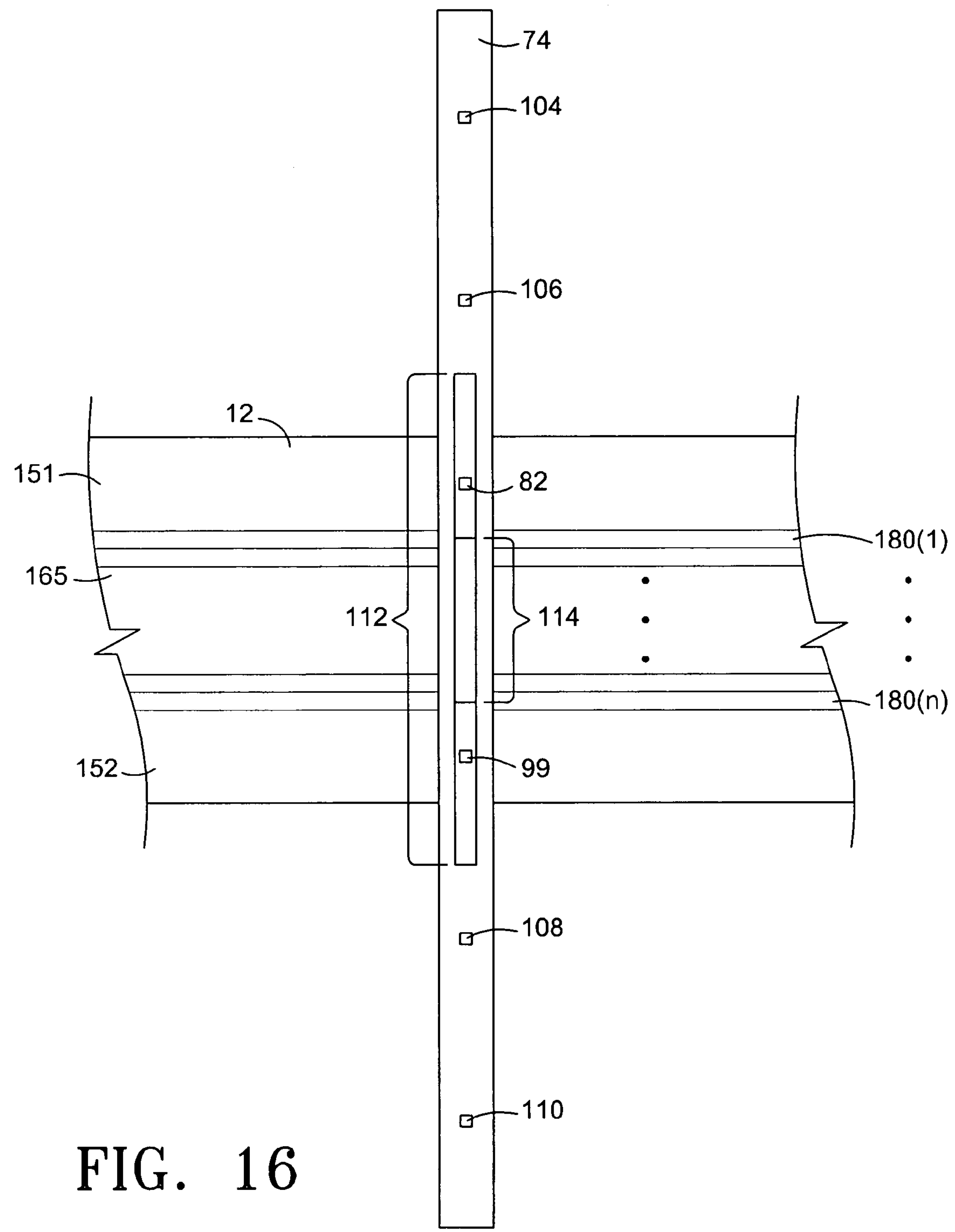

FIG. 16 illustrates the head shown in FIG. 6 positioned over a data band from the tape format of FIG. 15.

Figure 17:
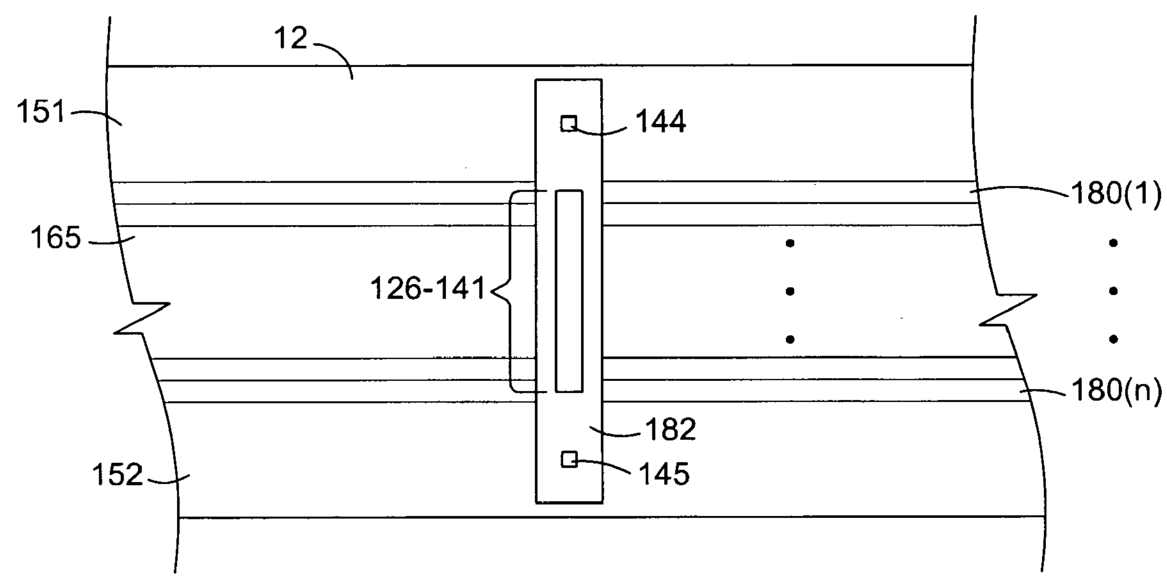

FIG. 17 illustrates a head similar to the head shown in FIG. 11 positioned over a data band from the tape format of FIG. 15.

DESCRIPTION

Embodiments of the present invention were developed in an effort to reduce the adverse effect of tape dimensional instability on head to tape alignment. Embodiments of the invention will be described with reference to an LTO tape drive. The invention, however, is not limited to use in LTO drives but may be implemented in other tape drives or other recording devices.

Figure 1:
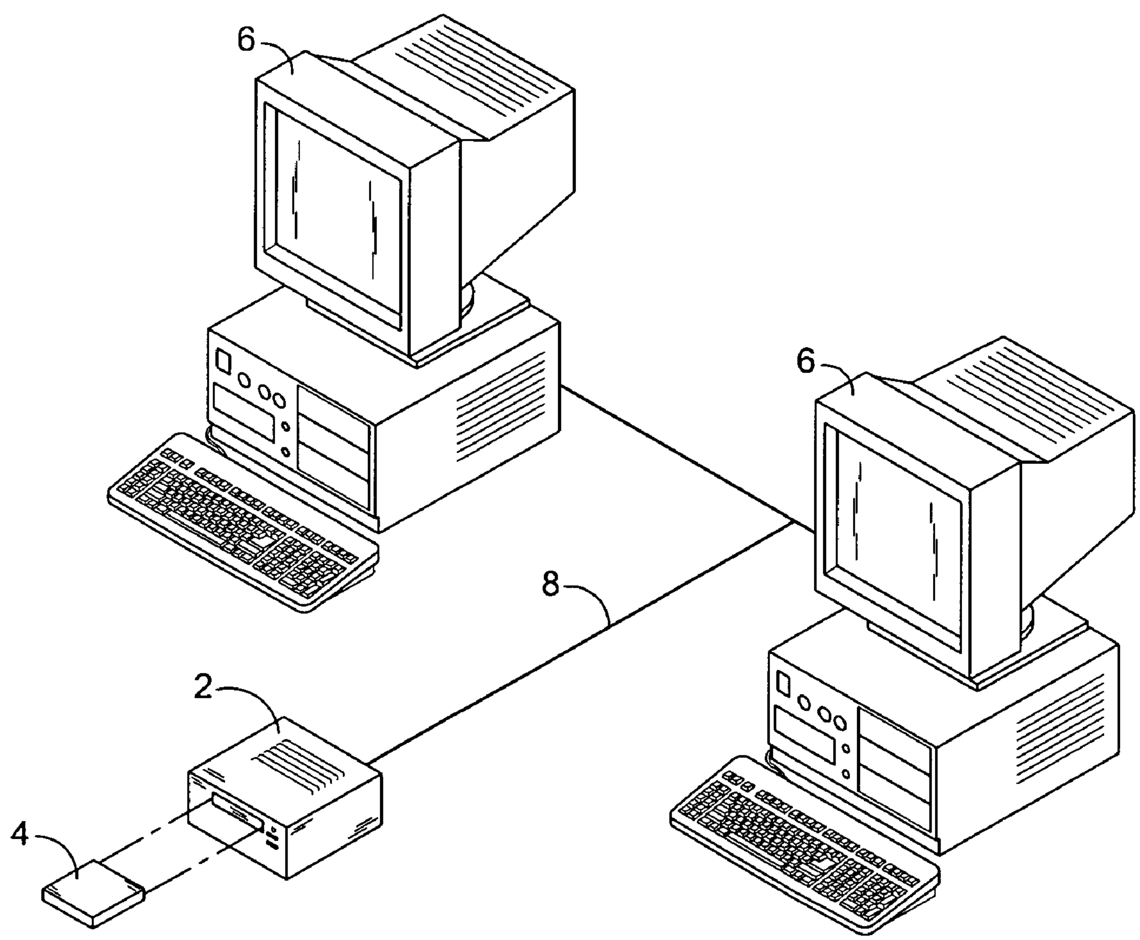
FIG. 1 shows computers networked to a tape drive.
Figure 2:
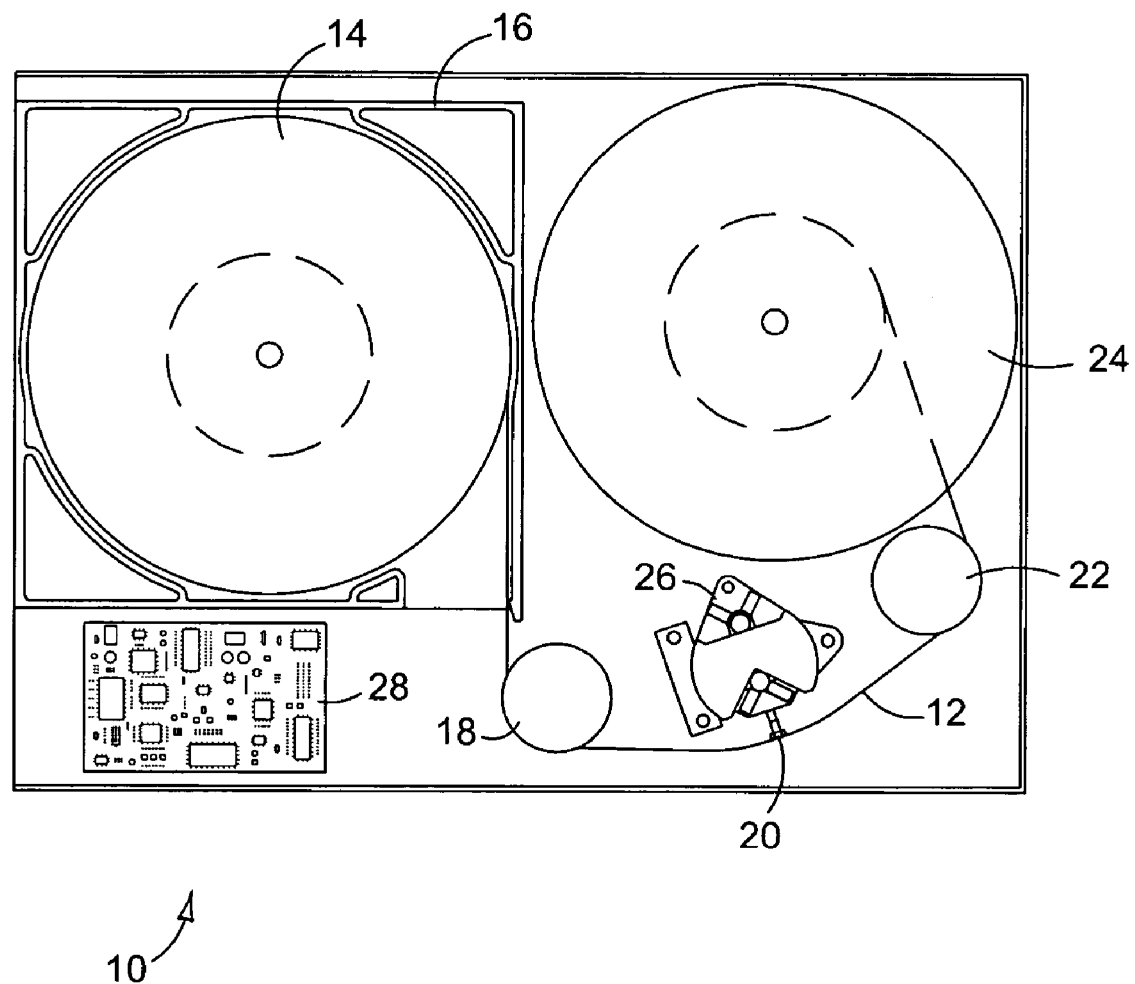
FIG. 2 is a plan view illustrating an LTO drive that may be used to implement embodiments of the invention.

FIG. 1 illustrates a tape drive 2 with a removable tape cartridge 4 networked to computers 6 through a wired or wireless link 8. FIG. 2 illustrates an LTO drive 10 such as might be used in the network of FIG. 1. In tape drive 10 in FIG. 2, magnetic tape 12 is wound on supply reel 14 inside removable cartridge 16. When cartridge 16 is inserted into drive 10, tape 12 passes around guide 18, over head 20, around guide 22, to take up reel 24. As described in detail below, head 20 contains an array of elements that read and record information on tape 12. A "head element" or just "element" as used in this document means a transducer that converts an electrical signal to the form required to record the signal to a medium (a write element), or reads a signal from a medium and converts it to an electrical signal (a read element), or both. A servo element refers to a head element configured to read head positioning information. Head positioning information is often referred to as servo information. A data element refers to a head element configured to record, read or record and read information other than head positioning information, unless the data element is specially configured to also read head positioning information. Tape drives typically use magnetic head elements, where an electrical signal drives a time-varying magnetic field that magnetizes spots, or domains, on the surface of the magnetic tape. A CD-ROM drive typically uses an optical head, where an electrical signal drives a laser that varies the reflectivity of an optical medium.

Head 20 is mounted to an actuator 26 which moves head 20 across the width of tape 12. An electronic controller 28 receives read and write instructions and data from a computer 6 (FIG. 1) or other host device. Controller 28, which may include more than one controller unit, includes the programming, processor(s) and associated memory and electronic circuitry necessary to control actuator 26, head 20 and the other operative components of tape drive 10. As actuator 26 carries head assembly 20 back and forth across the width of tape 12, controller 28 selectively activates the head elements to read or record data on tape 12 according to instructions received from the host device.

FIG. 3 shows one format for an LTO tape 12. Tape 12 is nominally 12.6 mm (½ inch) wide. Five servo bands 30, 32, 34, 36 and 38 border four data bands 40, 42, 44 and 46. Edge guard bands 48 and 50 separate the top and bottom servo bands 30 and 38 from the edge of tape 12. In a current generation LTO tape 12, known to those skilled in the art as the second generation, each data band 40, 42, 44 and 46 includes 128 data tracks (512 tracks total). In an immediate next generation LTO tape 12 currently in development, known to those skilled in the art as the third generation, each data band 40, 42, 44 and 46 includes 176 data tracks (704 tracks total). It is expected that future generations of LTO tape 12 will include even more data tracks.

Figure 4:
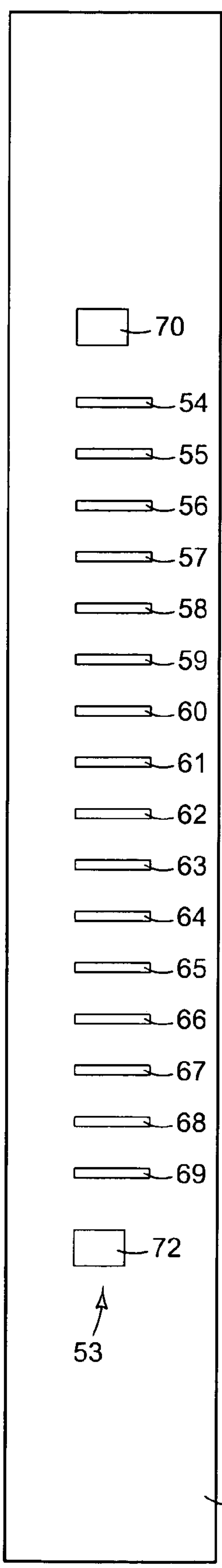
FIG. 4 is a schematic illustration of an array of head elements in a current/third generation LTO drive.

FIG. 4 is a schematic illustration of a head 52 that includes an array 53 of sixteen data elements 54-69 used in an immediate next generation LTO drive currently in development, known to those skilled in the art as the third generation. Head 52 also includes a servo element 70 above the data elements and a servo element 72 below the data elements. Servo elements 70 and 72 read servo information from the servo bands bordering each data band on tape 12 (FIG. 3). For example, and referring also to FIG. 3, if array 53 on head 52 is positioned over data band 1 42, then servo elements 70 and 72 read the servo positioning information recorded on servo band 1 32 and servo band 2 34. Positioning head 52 occurs in two stages for a typical read or record operation. In a first "coarse" positioning stage, head 52 is brought close enough to the desired data band (data band 1 42 in this example) to read servo information on the bordering servo bands (servo bands 1 32 and 2 34 in this example). Then, in a second "fine" positioning stage, servo information read from servo bands 1 32 and 2 34 is used to position data elements 54-69 over the desired tracks within data band 1 42.

Figure 5:
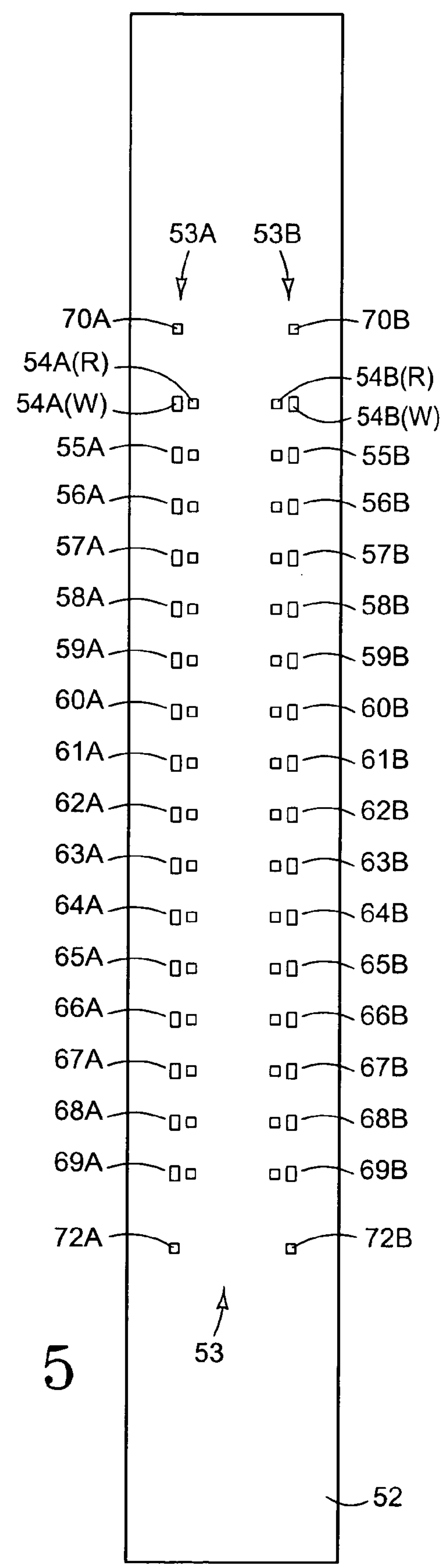
FIG. 5 illustrates one example of the layout of the elements in the array of FIG. 4.

FIG. 5 illustrates one example of the layout of the head elements in array 53 in a third generation LTO drive. Referring to FIG. 5, array 53 consists of two arrays 53A and 53B spaced apart from one another across head 52 in the direction the tape moves past head 52. Each servo element 70, 72 consists of two read elements 70A, 70B and 72A, 72B. Servo elements 70A and 72A read servo information when the tape is moving in one direction past head 52 and servo elements 70B and 72B read servo information when the tape is moving in the opposite direction past head 52. Each data element 54-69 consists of two element pairs 54A-69A and 54B-69B. Each element pair includes a read element, e.g., read elements 54A(R) and 54B(R), and a write element, e.g., write elements 54A(W) and 54B(W). Read elements in the A array and write elements in the B array (e.g., 54A(R) and 54B(W)) read and record data on the tape when the tape is moving in one direction. Read elements in the B array and write elements in the A array (e.g., 54B(R) and 54A(W)) read and record data on the tape when the tape is moving in the opposite direction.

FIG. 6 is a schematic illustration of a head 74 that includes an array 76 of data elements 78-103 and servo elements 104, 106, 108 and 110 arranged according to one embodiment of the invention. Referring to FIG. 6, array 76 is arranged into two groups of data elements 112 and 114. There are sixteen elements in each group 112, 114. First group 112 includes elements 78-83, 86, 89, 92, 95, and 98-103. Second group 114 includes more closely spaced elements 83-98. Data elements 83, 86, 89, 92, 95, and 98 are included on both groups 112 and 114. The elements in first group 112 correspond to the sixteen data elements shown in FIG. 4 that are used in third generation LTO drives. In the embodiment shown in FIG. 6, the span of the elements in second group 114 along head 74 is ⅓ the span of the elements in first group 112 and the second group elements are centered in the span of the first group elements.

To support one mode of use for head 74 described below with reference to FIGS. 8-10, elements 82 and 99 are configured to read and record data on data bands and to read servo information on servo bands. This dual "configuration" of elements 82 and 99 occurs in the control circuitry (not shown) that supports these elements by including both a data read channel and a servo read channel for each element 82 and 99. The physical structure of elements 82 and 89 on head 74 is the same as the other data elements. As an alternative to using dual configuration data elements, discrete servo elements 116 and 118 may be added adjacent to data elements 82 and 99.

Figure 7:
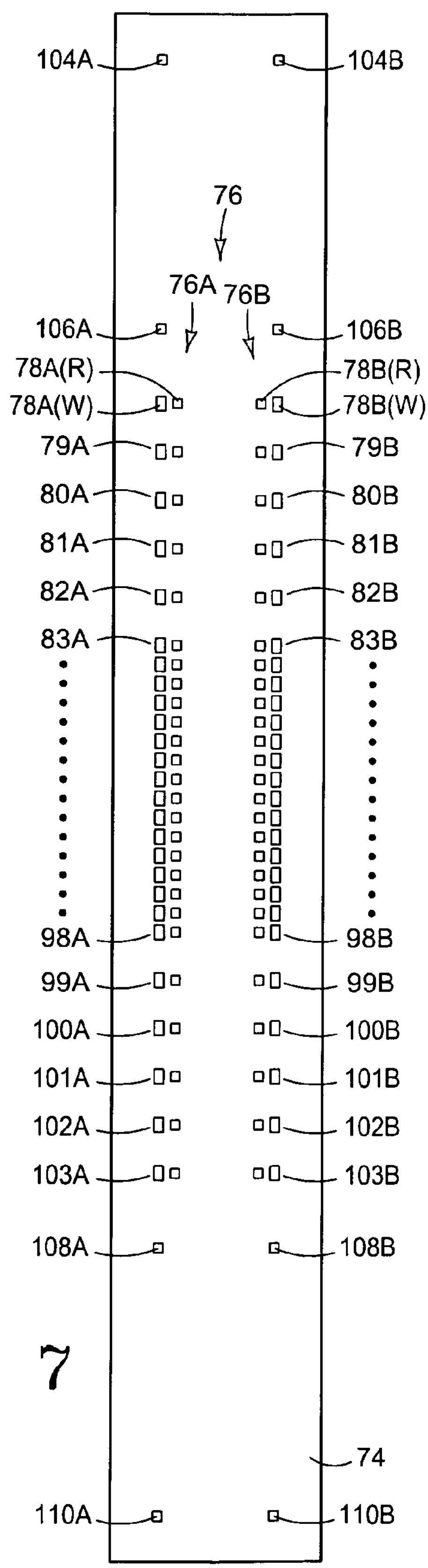
FIG. 7 illustrates one example of the layout of the elements in the array of FIG. 6.

FIG. 7 illustrates one example of the layout of the head elements in array 76 as they might appear in a fourth generation LTO drive. Referring to FIG. 7, array 76 consists of two arrays 76A and 76B spaced apart from one another across head 74 in the direction the tape moves past head 74. Each servo element 104, 106, 108 and 110 consists of two read elements 104A and 104B, 106A and 106B, 108A and 108B, and 110A and 110B. Servo elements 104A, 106A, 108A, and 110A read servo information when the tape is moving in one direction past head 74 and servo elements 104B, 106B, 108B, and 110B read servo information when the tape is moving in the opposite direction past head 74. Each data element 78-103 consists of two element pairs 78A-103A and 78B-103B. Each element pair includes a read element, e.g., read elements 78A(R) and 78B(R), and a write element, e.g., write elements 78A(W) and 78B(W). Read elements in the A array and write elements in the B array (e.g., 78A(R) and 78B(W)) read and record data on the tape when the tape is moving in one direction and read elements in the B array and write elements in the A array (e.g., 78B(R) and 78A(W)) read and record data on the tape when the tape is moving in the opposite direction.

The use of head 74 to read and record data on a tape formatted like tape 12 in FIG. 3 will now be described with reference to FIGS. 8-10. FIGS. 8-10 show head 74 positioned over, for example, data band 1 42 bordered by servo bands 1 32 and 2 34 along a portion of tape 12. Data band 1 42 includes multiple tracks 120(1)-120(*n*). Head 74 may be used in two modes. In a first mode, when tape 12 is a third generation tape for example, then the elements in first group 112 (elements 78-83, 86, 89, 92, 95, and 98-103 in FIG. 6) are used to read and record data on tape 12 in connection with positioning information read by servo elements 106 and 108. In the third generation LTO tape 12, each data band includes 176 tracks. So, in this mode each of the sixteen first group 112 elements accesses eleven tracks during fine positioning in each data band. A set of sixteen tracks recorded simultaneously is called a wrap. The eleven wraps on each data band are recorded in a spiraling sequence. Positioning information on servo band 1 32 and servo band 2 34 read by servo elements 106 and 108 is used to control the movement of head 74 between and during each wrap.

In a second mode, if tape 12 is a fourth generation tape for example, then the elements in second group 114 (elements 83-98 in FIG. 6) are used to read and record data on tape 12 in connection with positioning information read by servo elements 104, 106, 82/116, 99/118, 108 and 110. In the embodiment of head 74 shown in FIGS. 6-10, the span of the elements in second group 114 along head 74 is ⅓ the span of the elements in first group 112. In this second mode, therefore, second group elements 114 must be positioned at three different locations within data band 1 42 to read all tracks 120 (1)-120(*n*). FIG. 8 illustrates head 74 with second group 114 located during coarse positioning over the middle third of data band 1 42. In this location, position information is read by servo elements 106 and 108. FIG. 9 illustrates head 74 with second group 114 located during coarse positioning over the top third of data band 1 42. In this location, position information is read by servo elements 82/116 and 110. FIG. 10 illustrates head 74 with second group 114 located during coarse positioning over the bottom third of data band 1 42. In this location, position information is read by servo elements 104 and 99/118. In the fourth generation LTO tape 12 each data band may include as many as 288 tracks (1152 tracks total across the four data bands). So, each of the sixteen second group 114 elements would access eighteen tracks in each data band from three different locations (coarse positioning) covering six tracks in each location (fine positioning).

The effect of changes in the width of the tape on head to tape alignment is proportional to the total span of the array of head elements. Therefore, reducing the span of the head array will reduce the effect of changes in the width of the tape on head to tape alignment. For example, in a third generation LTO head such as head 52 shown in FIGS. 4 hand 5, the sixteen data elements in the array span approximately 2.5 mm. If this span is reduced by a factor of three in future generation heads, to approximately 0.83 mm, as in the group two elements of head 74 shown in FIGS. 6 and 7, then the contribution to misalignment from the dimensional instability of the tape can be reduced to approximately ⅓ of its current value. While any reduction in the span of the data elements can result in a corresponding reduction in misalignment due to tape dimensional instability, the degree of span reduction is effectively limited by current techniques for fabricating the data elements. A three factor reduction is presently preferred as the greatest reduction practicable within the constraints of current fabrication techniques.

The addition of the more widely spaced group one data elements on head 74 enables using the head with both third generation tapes and fourth generation tapes. This "backward compatibility" for the element array of head 74 shown in FIG. 6 is evident in the mode one and mode two uses described above.

FIG. 11 is a schematic illustration of a head 122 that includes an array 124 of sixteen data elements 126-141 and six servo elements 142-147 arranged according to one embodiment of the invention. FIGS. 12-14 show head 122 positioned over, for example, data band 1 42 bordered by servo bands 1 32 and 2 34 along a portion of tape 12. Data band 1 42 includes multiple tracks 120(1)-120(*n*). In this embodiment, data element array 124 spans approximately ⅓ of data band 1 42. Array 124, therefore, must be positioned at three different locations within data band 1 42 to read all tracks 120(1)-120(*n*). Data band 1 42 typically will include many more than 48 tracks. Consequently, array 124 will be moved through multiple positions at each location to cover all tracks. For example, if there are 288 tracks across data band 1 42 (1152 tracks total across the four data bands), then each of the sixteen data elements in array 124 would access six tracks at each of the three locations.

In FIG. 12, array 124 is located over the middle third of data band 1 42. At this location, position information is read from servo bands 1 32 and 2 34 by servo elements 143 and 146. In FIG. 13, array 124 is located over the top third of data band 1 42. At this location, position information is read from servo bands 1 32 and 2 34 by servo elements 144 and 147. In FIG. 14, array 124 is located over the bottom third of data band 1 42. At this location, position information is read from servo bands 1 32 and 2 34 by servo elements 142 and 145.

FIG. 15 shows a new tape format that might be used, for example, in a next generation LTO tape 12. Thirteen servo bands 150-162 border twelve data bands 164-175. Edge guard bands 176 and 178 separate the top and bottom servo bands 150 and 162 from the edge of tape 12. Again, tape 12 is nominally 12.6 mm (½ inch) wide. Hence, each data band 164-175 in this new format is approximately ⅓ the width of each data band on a tape formatted like the tape shown in FIG. 3. Correspondingly, each servo band 150-162 is proportionately more narrow than the servo bands on a tape formatted like the tape shown in FIG. 3 because the head does not need to move as far to access all the tracks on each data band.

FIG. 16 shows head 74 (from FIG. 6) positioned over, for example, data band 1 165 bordered by servo bands 1 151 and 2 152 along a portion of tape 12. Data band 1 165 includes multiple tracks 180*a*-180*n*. The second group 114 of elements on head 74 are located over data band 1 165 and position information is read by servo elements 82 and 99. Using this format in a next/fourth generation LTO tape 12 with 1152 total tracks, each data band would only include 96 tracks. So, each of the sixteen second group 114 data elements would access eight tracks in each data band.

FIG. 17 shows head 182 positioned over, for example, data band 1 165 bordered by servo bands 1 151 and 2 152 along a portion of tape 12. Head 182 is the same as head 122 shown in FIG. 11 except that the top two servo elements and the bottom two servo elements of head 122 are omitted. Only two servo elements 144 and 145 adjacent to data elements 126-141 are needed to read servo information on servo bands 151, 152 because head 182 does not need to move far to access all tracks 180(1)-180(*n*) on data band 1 165. Using this format in a next/fourth generation LTO tape 12 with 1152 total tracks, for example, each data band would include 96 tracks. So, each of the sixteen data elements 126-141 would only have to access six tracks in each data band.

The exemplary embodiments shown in the figures and described above illustrate but do not limit the invention. Other forms, details, and embodiments may be made and implemented. Hence, the foregoing description should not be construed to limit the scope of the invention, which is defined in the following claims.

What is claimed is:

1. A head for reading and recording data on multiple tracks on a magnetic tape, comprising:
- first data elements spaced apart from one another a first distance across a first part of the head;
- second data elements spaced apart from one another a second distance ⅓ the first distance across a second part of the head adjacent to the first part of the head;
- third data elements spaced apart from one another the first distance across a third part of the head adjacent to the second part of the head;
- a first series of three servo elements spaced apart from one another along the head on one side of the second data elements; and
- a second series of three servo elements spaced apart from one another along the head on the other side of the second data elements opposite the first series of three servo elements.

2. The head of claim 1, wherein one of the first data elements located immediately adjacent to the second data elements is configured to function as a data element and as one of the servo elements in the first series of servo elements and one of the third data elements located immediately adjacent to the second data elements is configured to function as a data element and as one of the servo elements in the second series of servo elements.

* * * * *

UNITED STATES PATENT AND TRADEMARK OFFICE

CERTIFICATE OF CORRECTION

PATENT NO. : 7,529,060 B2
APPLICATION NO. : 10/770747
DATED : May 5, 2009
INVENTOR(S) : Ralph F. Simmons, Jr. et al.

It is certified that error appears in the above-identified patent and that said Letters Patent is hereby corrected as shown below:

In column 5, line 11, after "FIGS. 4" delete "hand" and insert -- and --, therefor.

Signed and Sealed this

Fifteenth Day of September, 2009

David J. Kappos
*Director of the United States Patent and Trademark Office*